(12) United States Patent
Lu et al.

(10) Patent No.: US 9,238,318 B2
(45) Date of Patent: Jan. 19, 2016

(54) METHOD FOR MANUFACTURING A MOTOR

(75) Inventors: Chao-Wen Lu, Taoyuan Hsien (TW);
Chih-Wei Chan, Taoyuan Hsien (TW)

(73) Assignee: DELTA ELETRONICS, INC., Taoyuan Hsien (TW)

( * ) Notice: Subject to any disclaimer, the term of this patent is extended or adjusted under 35 U.S.C. 154(b) by 527 days.

(21) Appl. No.: 13/598,368

(22) Filed: Aug. 29, 2012

(65) Prior Publication Data
US 2013/0056902 A1   Mar. 7, 2013

(30) Foreign Application Priority Data

Sep. 2, 2011   (TW) .............................. 100131621 A

(51) Int. Cl.
*B29C 45/14* (2006.01)

(52) U.S. Cl.
CPC ..... *B29C 45/14467* (2013.01); *B29C 45/14311* (2013.01); *B29C 2045/1454* (2013.01)

(58) Field of Classification Search
None
See application file for complete search history.

(56) References Cited

U.S. PATENT DOCUMENTS

| 2,968,199 | A  | * | 1/1961 | Bracken | 408/72 B |
|---|---|---|---|---|---|
| 3,022,685 | A | * | 2/1962 | Armacost | 408/241 R |
| 3,608,049 | A | * | 9/1971 | Tavella | 264/229 |
| 5,145,143 | A | * | 9/1992 | Jackson et al. | 248/635 |
| 6,193,417 | B1 | * | 2/2001 | Brandenstein et al. | 384/447 |
| 6,394,779 | B1 | * | 5/2002 | Komazawa et al. | 425/123 |
| 6,591,708 | B2 | * | 7/2003 | Kobayashi et al. | 74/446 |
| 2001/0030381 | A1 | * | 10/2001 | Kobayashi et al. | 264/257 |
| 2006/0179166 | A1 | * | 8/2006 | Nagai | 710/5 |

* cited by examiner

*Primary Examiner* — Edmund Lee
(74) *Attorney, Agent, or Firm* — Muncy, Geissler, Olds & Lowe, P.C.

(57) ABSTRACT

A method for manufacturing a motor includes the following steps of: providing a substrate with an opening and a bushing; disposing the bushing within the opening of the substrate; providing a cushioning material disposed between the substrate and the bushing by injection molding.

12 Claims, 9 Drawing Sheets

METHOD FOR MANUFACTURING A MOTOR

CROSS REFERENCE TO RELATED APPLICATIONS

This Non-provisional application claims priority under 35 U.S.C. §119(a) on Patent Application No(s). 100131621 filed in Taiwan, Republic of China on Sep. 2, 2011, the entire contents of which are hereby incorporated by reference.

BACKGROUND OF THE INVENTION

1. Field of Invention

The present invention relates to a motor, a method for manufacturing the motor and a fan.

2. Related Art

FIG. 1 is a schematic diagram showing a part of a conventional motor 1. The conventional motor 1 is an example of motor applied to a fan. The motor 1 includes a substrate 11, a bearing 12, a shaft 13 and a stator 14. The bearing 12 is disposed within an opening 111 of the substrate 11. The bearing 12 and the substrate 11 can be integrally formed. If the bearing 12 and the substrate 11 are separate components, they can be connected by injection molding or riveting (as shown in FIG. 1).

When the fan rotates, the motor 1 also functions and rotates. However, the motor 1 vibrates after rotating and the vibration transmits to the connecting bearing 12 and substrate 11. Besides, the noise is produced accompanying with the vibration. To solve the problems mentioned above, manufacturers emphasize more on reducing and isolating the vibration. The conventional technique is to enhance the design of the structure strength of the motor, to add cushioning material around some portions, or to reduce the motor performance to decrease the vibration.

However, as lighter and thinner electronic products are demanded, it is more important to reduce the number of the elements and size of the electronic product. The above-mentioned solutions definitely would increase the number of the elements and required space. Thus, it is an important subject to provide a motor and its manufacturing method, which are able to reduce transmission of vibration, to assure the connection strength between the substrate and the bearing, to raise the production yield and to reduce labor time and cost.

SUMMARY OF THE INVENTION

In view of the foregoing, an object of this invention is to provide a motor and its manufacturing method and a fan, which can efficiently reduce the transmission of vibration, simplifying the assembling process and raise the production rate.

To achieve the above object, this invention discloses a manufacturing method of a motor including the following steps of: providing a substrate with an opening and a bushing, disposing the bushing within the opening of the substrate, and providing a cushioning material by injection molded between the substrate and the bushing.

In one embodiment of the present invention, a radial periphery of the bushing corresponding to the substrate has at least a non-smooth surface. In the step of providing the cushioning material between the substrate and the bushing by injection molding, the cushioning material is disposed in the opening and combined with the non-smooth surface.

In one embodiment of the present invention, the opening is circular, flower-shaped, polygonal or irregular.

In one embodiment of the present invention, the substrate has a bottom portion and a protruding portion protruding from the bottom portion, and the protruding portion extends toward the bushing.

In one embodiment of the present invention, the protruding portion extends from the bottom portion in axially tilting or stepwise.

In one embodiment of the present invention, in the step of providing the cushioning material between the substrate and the bushing by injection molding, the cushioning material covers the protruding portion.

In one embodiment of the present invention, the bushing has a first tilt surface and a second tilt surface disposed axially corresponding to each other, and the protruding portion is protruding between the first tilt surface and the second tilt surface.

In one embodiment of the present invention, in the step of providing the cushioning material between the substrate and the bushing by injection molding, the cushioning material is disposed between the first tilt surface and the second tilt surface.

In one embodiment of the present invention, the bushing has an open end and a corresponding close end. In the step of providing the cushioning material between the substrate and the bushing by injection molding, the cushioning material surrounds the close end to form a bottom surface, which is located on the same plane as the close end of the bushing.

In one embodiment of the present invention, the bushing includes two open ends disposed corresponding to each other. In the step of providing the cushioning material between the substrate and the bushing by injection molding, the cushioning material covers one of the open ends of the bushing.

In one embodiment of the present invention, in the step of providing the cushioning material between the substrate and the bushing by injection molding, the cushioning material extends to the internal of the bushing and forms a limit element in the internal of the bushing.

In one embodiment of the present invention, after the step of providing the cushioning material between the substrate and the bushing by injection molding, the method further includes a step of providing and inserting a shaft into the bushing. Herein, the shaft is inserted into the bushing from the other open end.

In one embodiment of the present invention, the shaft has a circular concave trench. In the step of providing and inserting the shaft into the bushing, the limit element formed by the cushioning material extends to the circular concave trench to limit the upward movement of the shaft.

In one embodiment of the present invention, the limit element formed by the cushioning material includes a concave portion. In the step of providing and inserting the shaft into the bushing, at least one part of the shaft is inserted into the concave portion.

In one embodiment of the present invention, the substrate is not contacted with the bushing. In the step of providing the cushioning material between the substrate and the bushing by injection molding, the bushing and the substrate are connected by the cushioning material.

In one embodiment of the present invention, the cushioning material is silicon, rubber, damping material or elastic material.

To achieve the above object, this invention also discloses a motor manufactured by the above-mentioned method.

To achieve the above object, this invention also discloses a fan comprising the above-mentioned motor and a fan blade. The fan blade is disposed around the motor.

As mentioned above, the motor and its manufacturing method and the fan of the present invention not only reduce the vibration transmission between the substrate and the bushing but also provide a buffer between the substrate and the bushing. Besides, compared with the method of connecting the substrate and the bushing by assembling, to dispose the cushioning material by injection molding between the substrate and the bushing can connect the substrate and the bushing directly. Even that there is no other element for assembling the substrate and the bushing, it can still be assured that the substrate and the bushing are firmly connected. Thus, the present invention simplifies the manufacturing process and reduces the material cost.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
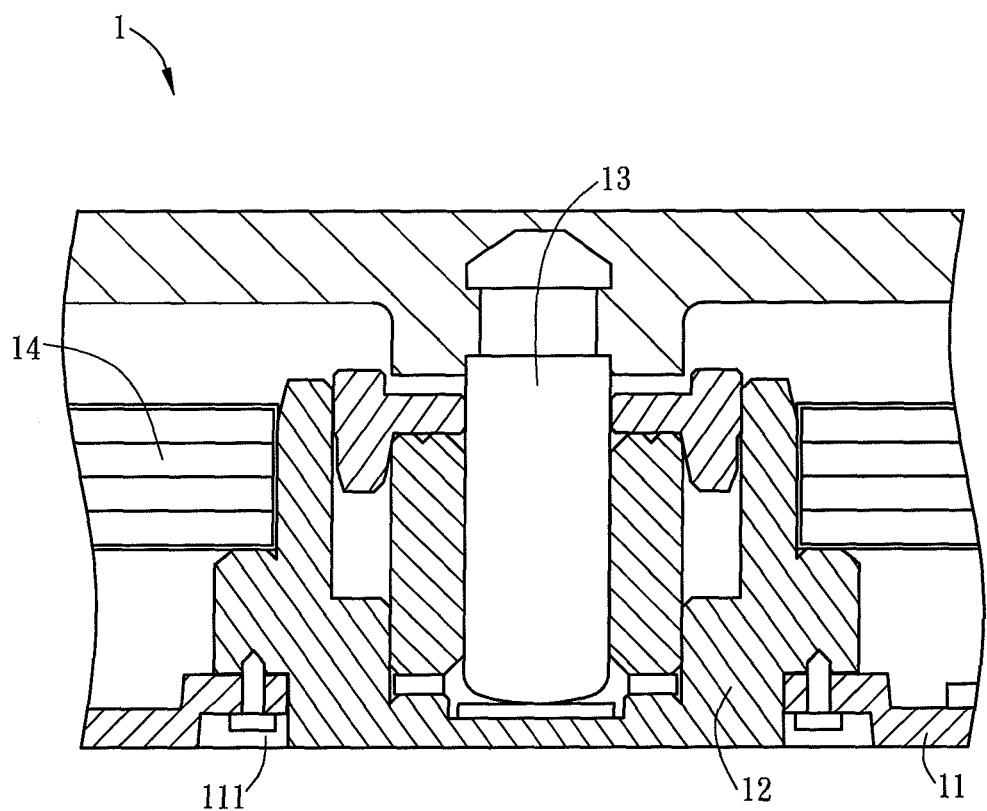
FIG. 1 is a schematic diagram showing a conventional motor.
Figure 2:
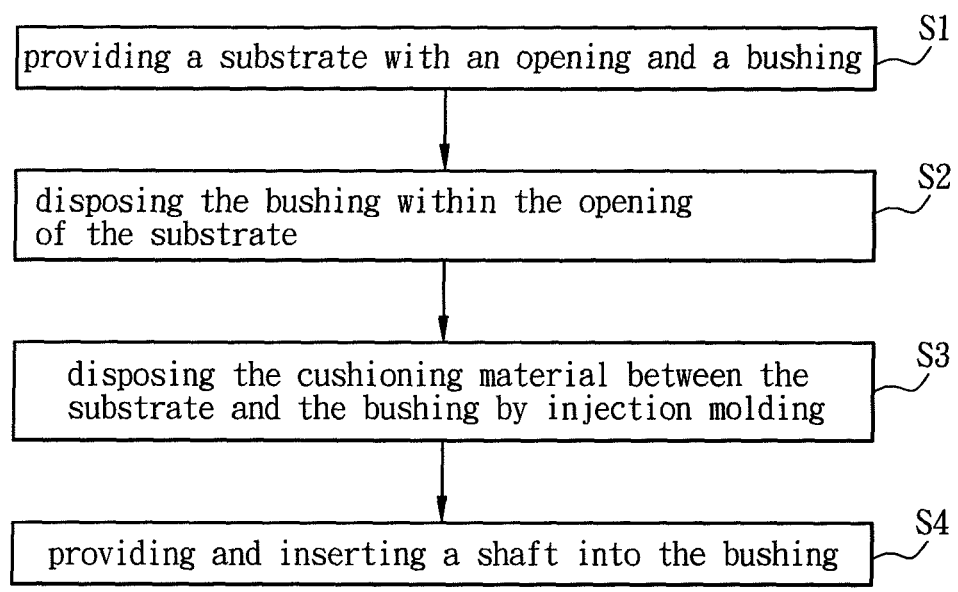
FIG. 2 is a flow chart of a manufacturing method for a motor according to a preferred embodiment of this invention.
Figure 3:
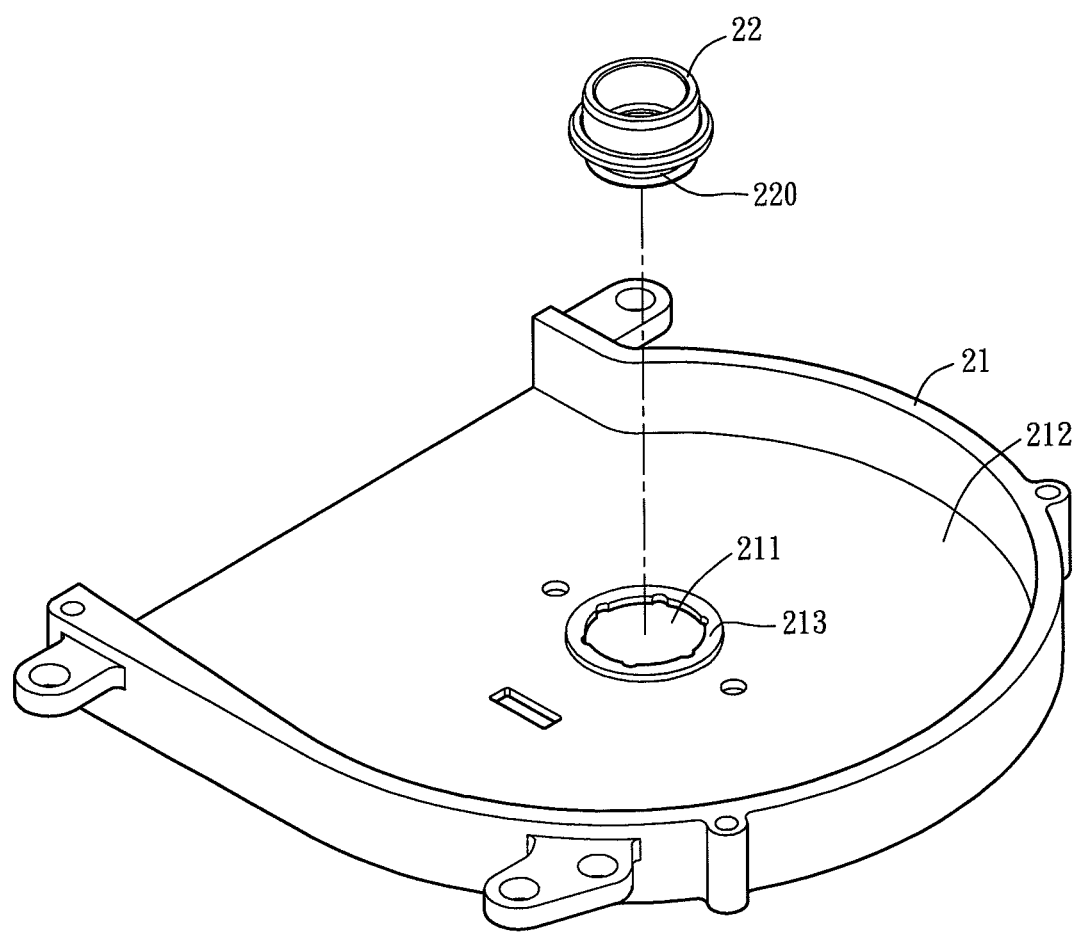
FIG. 3 is a schematic diagram showing a motor in manufacturing process according to the present invention.
Figure 4:
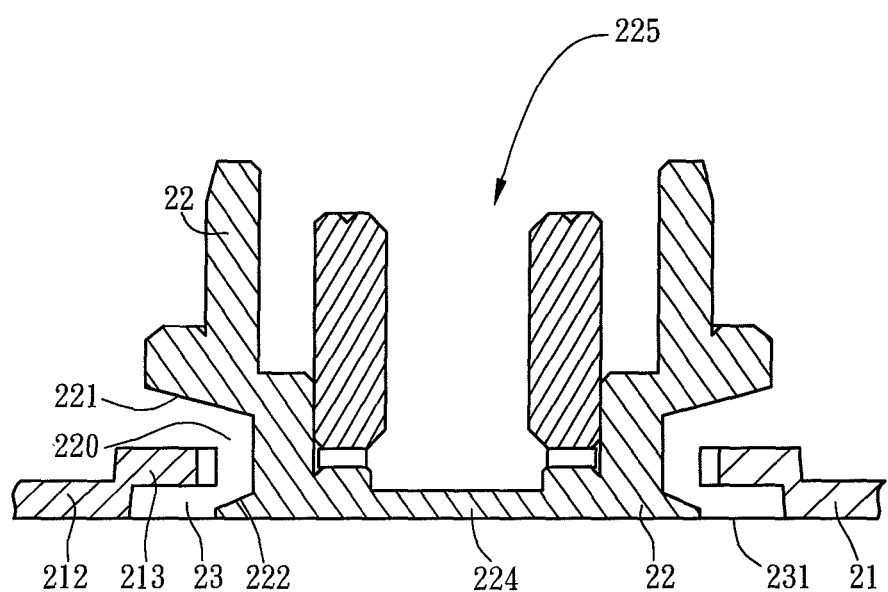
FIG. 4 is a sectional view of a motor in manufacturing process according to the present invention.

FIG. 2 is a flow chart of a manufacturing method for a motor according to a preferred embodiment of the present invention, FIG. 3 is a schematic diagram showing a motor in manufacturing process according to the present invention, and FIG. 4 is a sectional diagram showing a motor in manufacturing process according to the present invention. In this embodiment, a motor 2 can be applied to, for example but not limited to, the fan or the likes.

Figure 5:
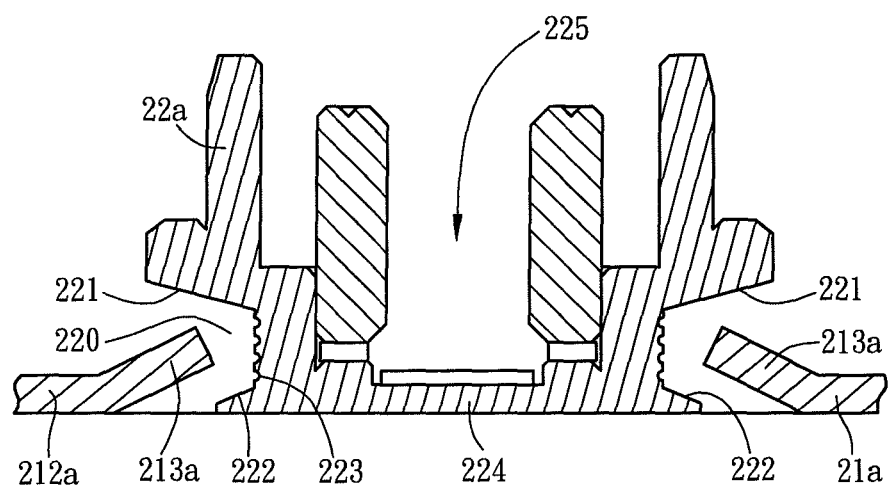
FIG. 5 is a sectional view of a motor in manufacturing process according to the present invention with a substrate and a bushing of another aspect.

First, referring to FIGS. 2 to 4, the step S1 is to provide a substrate 21 with an opening 211 and a bushing 22. The substrate 21 in this embodiment comprises a bottom portion 212 and a protruding portion 213. The protruding portion 213 is protruding from the bottom portion 212 and extending toward the bushing 22. In this case, the bottom portion 212 and the protruding portion 213 are integrally formed. The protruding portion 213 can be axially tilting and extending from the bottom portion 212, as shown in FIG. 5, or the protruding portion 213 can be stepwise extending from the bottom portion 212, as shown in FIG. 4.

Referring to FIGS. 2 to 4 again, in the step S2, the bushing 22 is disposed within the opening 211 of the substrate 21. The opening 211 can be, for example but not limited to, flower-shaped, circular, polygonal, or irregular. Otherwise, the periphery of the opening 211 can be serrate. The preferred shape of the opening 211 in this embodiment is flower-shaped. The size and the shape of the substrate are designed corresponding to those of the motor 2.

Besides, the bushing 22 in this embodiment is roughly round pipe shape. The radial periphery of the bushing 22 corresponding to the substrate 21 comprises a concave portion 220. The concave portion 220 comprises a first tilt surface 221 and a second tilt surface 222 disposed axially corresponding to each other. The protruding portion 213 is protruding between the first tilt surface 221 and the second tilt surface 222. FIG. 5 is a sectional view of a motor in manufacturing process according to the present invention with a substrate and a bushing of another aspect. Referring to FIG. 5, the bushing 22 of this embodiment can further comprise a non-smooth surface 223. The non-smooth surface 223 can be disposed in the concave portion 220. The non-smooth surface 223 is a surface with structures of through holes, recesses, saw-tooth portions, protrusions or threads. Herein, the number of the structure of through holes, recesses, saw-tooth portions, protrusions or threads depends on design or demand. The non-smooth surface 223 can also be an irregular rough surface.

Figure 6:
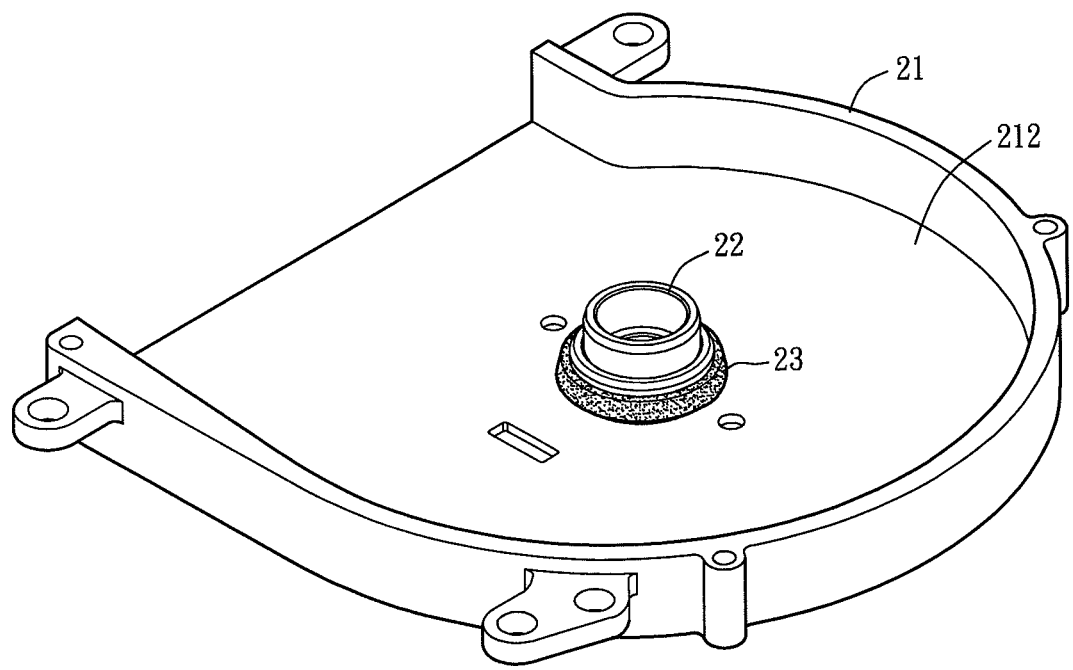
FIG. 6 is a perspective view showing the assembled substrate, bushing and cushioning material according to the present invention.
Figure 7:
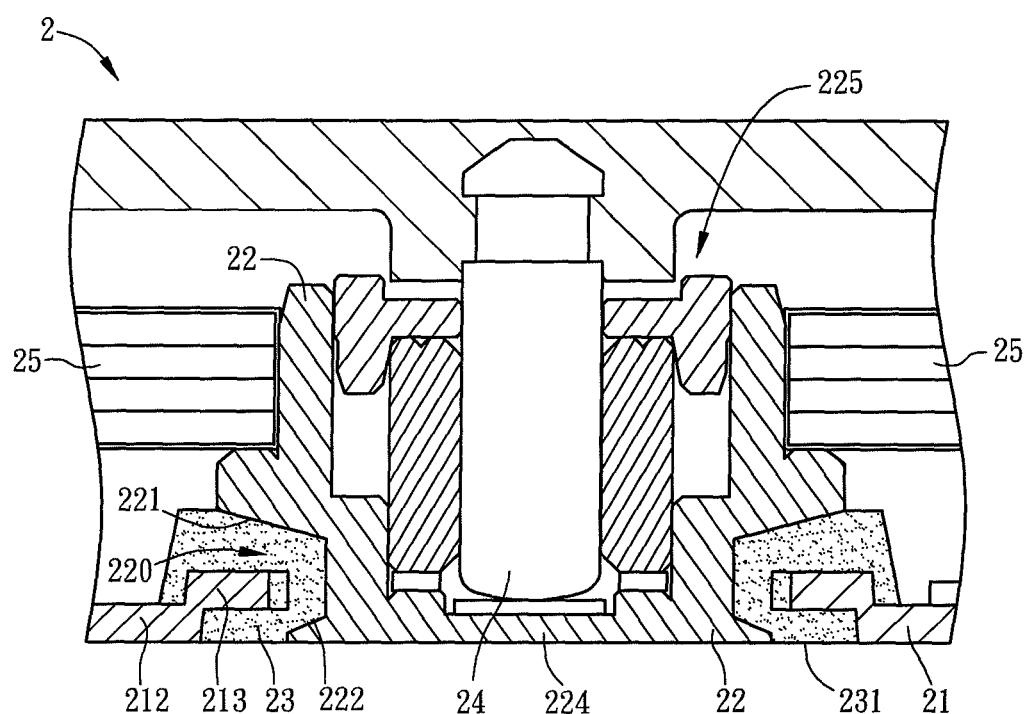
FIG. 7 is a sectional view showing a motor according to the present invention.

FIG. 6 is a perspective view showing the assembled substrate, a bushing and cushioning material according to the present invention, and FIG. 7 is a sectional view showing a motor according to the present invention. Referring to FIGS. 2, 6 and 7 simultaneously, the step S3 is to provide a cushioning material 23 disposed between the substrate 21 and the bushing 22 by injection molding. The cushioning material 23 is filled into the opening 211 of the substrate 21, and covers the protruding portion 213. In more detail, the cushioning material 23 is filled into the concave portion 220 of the bushing 22. A first tilt surface 221 and a second tilt surface 222 are disposed axially corresponding to each other in the concave portion 220. Each of the first tilt surface and the second tilt surface can be a beveling surface or a curved surface. In this embodiment, the tilt surfaces are both beveling surfaces. The first tilt surface and the second tilt surface provide a force of connection between the cushioning material 23 and the bushing 22. The cushioning material 23 covers the protruding portion 213 to provide a firm connection between the cushioning material 23 and the substrate 21. Thus, the bushing 22 and the substrate 21 are firmly connected by the cushioning material 23. As shown in FIG. 5, a bushing 22a can optionally comprise a non-smooth surface with through holes, recesses, saw-tooth portions, protrusions or threads. The connection of the cushioning material 23 and the non-smooth surface 223 can further increase the connection strength between the cushioning material 23 and the bushing 22a.

Further, the bushing 22 can comprise an open end 225 and a close end 224 disposed corresponding to each other, as shown in FIG. 7. The cushioning material 23 is disposed around the close end 224 of the bushing 22 and forms a bottom surface 231. The bottom surface 231 and the close end 224 of the bushing 22 are on the same plane.

After the step of disposing the cushioning material 23 between the substrate 21 and the bushing 22 by injection molding, the manufacturing method of the motor according to the present invention can further comprise a step S4 for providing and inserting a shaft 24 into the bushing 22. As shown in FIG. 2 and FIG. 7, the shaft 24 is preferably inserted into the bushing 22 from the open end 225. After the shaft 24 is inserted into the bushing 22, one end of the shaft is positioned adjacent to the close end 224 of the bushing 22.

Figure 8:
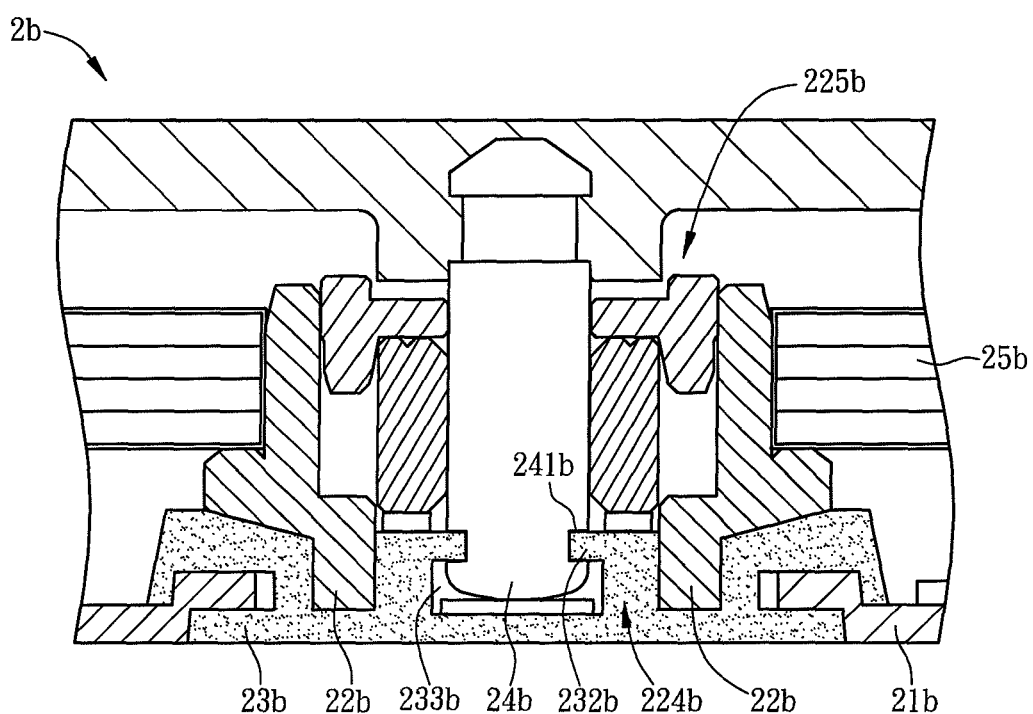
FIG. 8 is a sectional view showing a motor according to another aspect of the present invention.

FIG. 8 is a sectional view showing a motor according to another aspect of the present invention. With reference to FIG. 8, the bushing 22b can comprise a first open end 224b and a corresponding second open end 225b. In the step of disposing a cushioning material 23b between a substrate 21b and a bushing 22b by injection molding, the cushioning material 23b is covering the first open end 224b of the bushing 22b, and the cushioning material 23b extends to the internal of the bushing 22b and form a limit element 232b inside the bushing 22b. In the step of providing and inserting the shaft 24b into the bushing 22b, the shaft 24b is preferably inserted into the bushing 22b from the second open end 225b. The shaft 24b comprises a circular concave trench 241b. The limit element 232b formed of the cushioning material 23b is extended into the circular concave trench 241b to limit the shaft 24b move upward axially. When the limit element 232b formed of the cushioning material 23b is extended into the circular concave trench 241b of the shaft 24b, the limit element 232b is not contacted to the circular concave trench 241b to avoid the limit element 232b to affect the rotation of the shaft 24b. The limit element 232b formed of the cushioning material 23b can further comprise a concave portion 233b. At least one part of the shaft 24b is extended into the concave portion 233b.

As shown in FIG. 7 and FIG. 8, it is worth mentioned that the cushioning material 23/23b in this embodiment can be silicon, rubber, damping material, or other elastic materials. Besides, the substrate 21/21b is able not to contact to the bushing 22/22b. By disposing the cushioning material 23/23b between the substrate 21/21b and the bushing 22/22b, the substrate 21/21b can be connected to the bushing 22/22b. The cushioning material can prevent the bushing 22/22b from moving, twisting or rotating so as to provide a better buffer effect and further reduce transmission of vibration between the bushing 22/22b and the substrate 21/21b.

Furthermore, as shown in FIG. 7, the motor 2 includes a substrate 21, a bushing 22, a cushioning material 23, a shaft 24 and a stator 25. Wherein, the substrate 21, the bushing 22 and the cushioning material 23 has the same technical features as those of the above-mentioned embodiments, so the detailed descriptions thereof will be omitted. The shaft 24 is disposed in the bushing 22, and the stator is disposed around the bushing 22.

Figure 9:
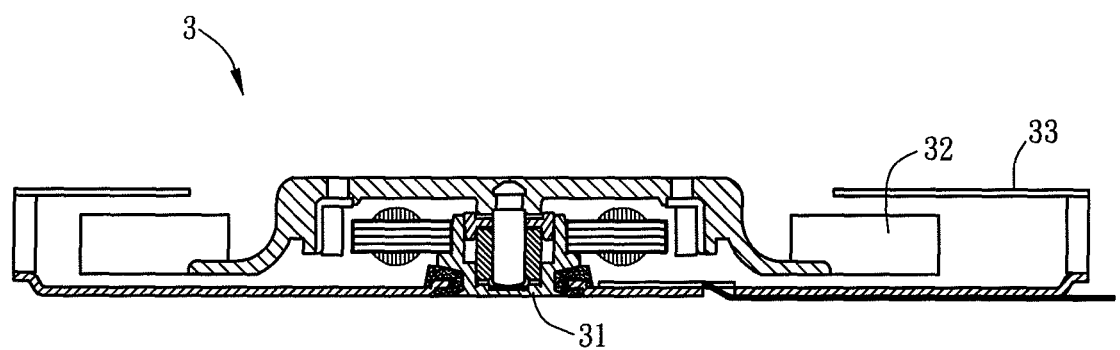
FIG. 9 is a schematic diagram showing a fan according to a preferred embodiment of the present invention.

FIG. 9 is a schematic diagram showing a fan according to a preferred embodiment of the present invention. Referring to FIG. 9, a fan 3 includes a motor 31, a fan blade 32 and a frame 33. Wherein, the motor 31 comprises the same technical features as the motor 2 in the above-mentioned example, so the detailed descriptions thereof will be omitted. The motor 31 and the fan blade 32 are disposed in the frame 33. The motor 31 is disposed at the center of the fan blade 32 and the fan blade is disposed around the motor 31. The fan 2 can be a centrifugal fan, an axial flow fan, an oblique flow fan or a cross flow fan. After the power is applied, the induced magnetic lines are produced between the rotor of the fan blade 32 and the stator of the motor 31. Then, the driving circuit controls the fan 3 to rotate.

In summary, the motor and its manufacturing method and the fan of the present invention are to dispose the cushioning material between the substrate and the bushing to reduce the transmission of the vibration between the substrate and the bushing, to provide a buffer between the substrate and the bushing and further to assure the firm connection of the substrate and the bushing. The processed cushioning material provides better buffer effect, reduces vibration range, increases the production yield of the connection of the substrate and the bushing, and shortens the production time.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A method for manufacturing a motor, comprising the following steps of:
   providing a bushing and a substrate with an opening, wherein the bushing has an open end and a corresponding close end;
   disposing the bushing within the opening of the substrate; and
   providing a cushioning material between the substrate and the bushing by injection molding,
   wherein in the step of providing the cushioning material between the substrate and the bushing by injection molding, the cushioning material is filled to surround the close end to form a bottom surface, which is located on the same plane as the close end of the bushing.

2. The method according to claim 1, wherein a radial periphery of the bushing corresponding to the substrate has at least a non-smooth surface, and in the step of providing the cushioning material between the substrate and the bushing by injection molding, the cushioning material is disposed in the opening and combined with the non-smooth surface.

3. The method according to claim 2, wherein the non-smooth surface is a surface with structures of through holes, recesses, saw-tooth portions, protrusions or threads, or an irregular rough surface.

4. The method of claim 1, wherein the opening is circular, flower-shaped, polygonal or irregular.

5. The method according to claim 1, wherein the substrate has a bottom portion and a protruding portion protruding from the bottom portion, and the protruding portion extends toward the bushing.

6. The method according to claim 5, wherein the protruding portion extends from the bottom portion in axially tilting or stepwise.

7. The method according to claim 6, wherein in the step of providing the cushioning material between the substrate and the bushing by injection molding, the cushioning material covers the protruding portion.

8. The method according to claim 7, wherein the periphery of the bushing corresponding to the substrate has a concave portion, and in the step of providing the cushioning material between the substrate and the bushing by injection molding, the cushioning material is disposed in the concave portion.

9. The method according to claim 8, wherein the bushing has a first tilt surface and a second tilt surface disposed axially corresponding to each other in the concave portion, and the protruding portion is protruding between the first tilt surface and the second tilt surface.

10. The method according to claim 1, further comprising, after the step of providing the cushioning material between the substrate and the bushing by injection molding, a step of providing a shaft inserted into the bushing, wherein the shaft is inserted into the bushing through the open end.

11. The method according to claim 1, wherein the substrate is not contacted with the bushing, and in the step of providing the cushioning material between the substrate and the bushing by injection molding, the bushing and the substrate are connected by the cushioning material.

12. The method according to claim 1, wherein the cushioning material is silicon, rubber, damping material or elastic material.

* * * * *